(12) United States Patent
Jiang et al.

(10) Patent No.: US 12,041,640 B2
(45) Date of Patent: Jul. 16, 2024

(54) INFORMATION TRANSMISSION METHOD, NETWORK DEVICE, AND TERMINAL

(71) Applicant: VIVO MOBILE COMMUNICATION CO., LTD., Guangdong (CN)

(72) Inventors: Dajie Jiang, Dongguan (CN); Xueming Pan, Dongguan (CN); Kai Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 520 days.

(21) Appl. No.: 17/192,450

(22) Filed: Mar. 4, 2021

(65) Prior Publication Data
US 2021/0195603 A1 Jun. 24, 2021

Related U.S. Application Data

(63) Continuation of application No. PCT/CN2019/102208, filed on Aug. 23, 2019.

(30) Foreign Application Priority Data

Sep. 10, 2018 (CN) .................... 201811052563.X

(51) Int. Cl.
*H04W 72/04* (2023.01)
*H04L 27/26* (2006.01)
(Continued)

(52) U.S. Cl.
CPC ......... *H04W 72/53* (2023.01); *H04L 27/2607* (2013.01); *H04W 24/10* (2013.01);
(Continued)

(58) Field of Classification Search
CPC ... H04W 72/53; H04W 72/046; H04W 72/23; H04W 72/30; H04W 72/1273;
(Continued)

(56) References Cited

U.S. PATENT DOCUMENTS

2009/0253435 A1 10/2009 Olofsson et al.
2013/0272132 A1 10/2013 Heo et al.
(Continued)

FOREIGN PATENT DOCUMENTS

CN 101305563 A 11/2008
CN 103973399 A 8/2014
(Continued)

OTHER PUBLICATIONS

First Office Action regarding Japanese Patent Application No. 2021-512880, dated Apr. 21, 2022. Translation provided by Bohui Intellectual Property.
(Continued)

*Primary Examiner* — Candal Elpenord
(74) *Attorney, Agent, or Firm* — Harness, Dickey & Pierce, P.L.C.

(57) ABSTRACT

An information transmission method includes: receiving, by a terminal, downlink information over a first beam of a single-frequency network cell group. The single-frequency network cell group includes at least two cells, the at least two cells include a first cell that supports transmission of at least two beams, and the first beam is one of the beams supported by the first cell.

20 Claims, 4 Drawing Sheets

---

Send downlink information to a terminal over a first beam of a single-frequency network cell group, where the single-frequency network cell group includes at least two cells, the at least two cells include a first cell that supports transmission of at least two beams, and the first beam is one of the beams supported by the first cell ⟋— 21

(51) Int. Cl.
*H04W 24/10* (2009.01)
*H04W 36/08* (2009.01)
*H04W 56/00* (2009.01)
*H04W 72/00* (2023.01)
*H04W 72/044* (2023.01)
*H04W 72/23* (2023.01)
*H04W 72/30* (2023.01)
*H04W 72/53* (2023.01)

(52) U.S. Cl.
CPC ......... *H04W 36/08* (2013.01); *H04W 56/001* (2013.01); *H04W 72/046* (2013.01); *H04W 72/23* (2023.01); *H04W 72/30* (2023.01)

(58) Field of Classification Search
CPC ... H04W 72/542; H04W 24/10; H04W 36/08; H04W 56/001; H04W 56/0015; H04W 48/12; H04W 48/16; H04W 16/28; H04L 27/2607; H04L 5/0023; H04L 5/0044; H04L 5/0035; H04L 5/0007; H04B 7/024; H04B 7/0617
USPC .................................................. 370/329–330
See application file for complete search history.

(56) References Cited

U.S. PATENT DOCUMENTS

| | | | |
|---|---|---|---|
| 2018/0192255 A1 | 7/2018 | Guo et al. | |
| 2018/0199328 A1* | 7/2018 | Sang | H04B 7/0617 |
| 2019/0223169 A1 | 7/2019 | Ren et al. | |
| 2019/0281574 A1* | 9/2019 | Reial | G01S 5/10 |
| 2019/0335517 A1* | 10/2019 | Reial | H04W 76/11 |
| 2019/0373592 A1 | 12/2019 | Ji et al. | |
| 2020/0022068 A1* | 1/2020 | Ly | H04J 11/0073 |
| 2020/0037385 A1* | 1/2020 | Park | H04W 56/001 |
| 2020/0059967 A1* | 2/2020 | Kim | H04W 74/0833 |
| 2020/0221363 A1* | 7/2020 | Lee | H04W 36/32 |
| 2020/0382189 A1* | 12/2020 | Chen | H04B 7/0639 |

FOREIGN PATENT DOCUMENTS

| | | |
|---|---|---|
| CN | 108135030 A | 6/2018 |
| CN | 108282198 A | 7/2018 |
| CN | 108282749 A | 7/2018 |
| JP | 2015518335 A | 6/2015 |
| WO | WO-2018017840 A1 | 1/2018 |
| WO | WO-2018063070 A1 | 4/2018 |
| WO | WO-2018084663 A1 | 5/2018 |
| WO | WO-2018231880 A1 | 12/2018 |

OTHER PUBLICATIONS

"NR Paging Channel," CATT, 3GPP TSG RAN WG1 Meeting 90bis, R1-171801, dated Oct. 13, 2017.
"On NR synchronization signal periodicity," Nokia, et al., 3GPP TSG-RAN WG1#87, R-1612804, dated Nov. 18, 2016.
"Discussion multi-TRP operation considering analog beamforming," LG Electronics, R1-161793, Nov. 18, 2016.
International Search Report and Written Opinion of the International Searching Authority regarding International Patent Application No. PCT/CN2019/102208, dated Nov. 28, 2019.
"On NR Paging Design," Ericsson, 3GPP TSG-RAN WG1 Meeting #89, R1-1708724, dated May 19, 2017.
"Remaining Details on NR Paging Design," Vivo, 3GPP TSG RAN WG1 Meeting #91, R1-1719759, dated Dec. 1, 2017.
"Handover In Unidirectional SFN," Ericsson, 3GPP TSG RAN WG4 Meeting #76bis, R4-156658, dated Oct. 16, 2015.
First Office Action regarding Chinese Patent Application No. 201811052563.X, dated Sep. 3, 2021. Translation provided by Bohui Intellectual Property.
Second Office Action regarding Chinese Patent Application No. 201811052563.X, dated Feb. 25, 2022. Translation provided by Bohui Intellectual Property.
"Synchronization using non-cell-defining signals," Ericsson, 3GPP TSG RAN WG1 Meeting #91, R1-1720944, dated Dec. 27, 2017.
Supplementary European Search Report regarding Patent Application No. 19860120.5-1213/3843476; PCT/CN2019/102208, dated Apr. 28, 2022.

* cited by examiner

Send downlink information to a terminal over a first beam of a single-frequency network cell group, where the single-frequency network cell group includes at least two cells, the at least two cells include a first cell that supports transmission of at least two beams, and the first beam is one of the beams supported by the first cell ⸺ 21

Receive downlink information over a first beam of a single-frequency network cell group, where the single-frequency network cell group includes at least two cells, the at least two cells include a first cell that supports transmission of at least two beams, and the first beam is one of the beams supported by the first cell ⸺ 61

INFORMATION TRANSMISSION METHOD, NETWORK DEVICE, AND TERMINAL

CROSS-REFERENCE TO RELATED APPLICATIONS

This application is a Bypass Continuation Application of PCT/CN2019/102208 filed on Aug. 23, 2019, which claims priority to Chinese Patent Application No. 201811052563.X filed on Sep. 10, 2018, which are incorporated herein by reference in their entirety.

TECHNICAL FIELD

The present disclosure relates to the field of communications technologies, and in particular, to an information transmission method, a network device, and a terminal.

BACKGROUND

In the 5th generation (5G) mobile communications system, high-frequency communication and large-scale antenna technologies are introduced with the intention of reaching a downlink transmission rate of 20 Gbps and an uplink transmission rate of 10 Gbps. In the high-frequency communication, a wider system bandwidth and a smaller antenna size can be provided, to facilitate deployment of large-scale antennas in network devices and user equipment (UE). Multi-beam/multiple transmission and reception point (Multi-TRP) sending and receiving can be supported on a network device side, and multi-beam sending and receiving can also be supported on a terminal side.

Signals can be transmitted over a plurality of narrow beams in each cell, transmission over the plurality of beams may be time-division, and each beam may cover a specific direction of the cell. A gain of transmission over a narrow beam at a moment is about 9 dB (eight times higher) relative to transmission over a wide beam (such as a beam covering the entire cell). However, in the single-cell multi-beam transmission scheme, a terminal needs to frequently perform cell reselection between cells.

In a single-frequency network (SFN) transmission scheme, a plurality of cells or a plurality of transmission points send same signals, there is no co-channel interference between different cells, and the plurality of signals can improve a signal-to-interference-plus-noise ratio (SINR), transmission quality, and a coverage effect. The plurality of cells can send signals through SFN transmission, where each cell transmits a wide beam, and a terminal can receive wide beams transmitted by the plurality of cells at a moment, thereby obtaining a diversity gain. Usually, three strongest cells are received by the terminal. Assuming that signal strengths of the three cells are equal, signal energy of the three cells received is three times higher than signal energy of a single cell received, with a gain of about 4 dB. In the SFN transmission scheme, the terminal does not need to frequently perform cell reselection between cells, but the transmission gain of this scheme is lower than that of the narrow beam transmission scheme, causing a coverage problem.

SUMMARY

Embodiments of the present disclosure provide an information transmission method, a network device, and a terminal.

According to a first aspect, an embodiment of the present disclosure provides an information transmission method, which is applied to a network device, the method including:

sending downlink information to a terminal over a first beam of a single-frequency network cell group, where the single-frequency network cell group includes at least two cells, the at least two cells include a first cell that supports transmission of at least two beams, and the first beam is one of the beams supported by the first cell.

According to a second aspect, an embodiment of the present disclosure further provides an information transmission method, which is applied to a terminal, the method including:

receiving downlink information over a first beam of a single-frequency network cell group, where the single-frequency network cell group includes at least two cells, the at least two cells include a first cell that supports transmission of at least two beams, and the first beam is one of the beams supported by the first cell.

According to a third aspect, an embodiment of the present disclosure provides a network device, including:

a first sending module, configured to send downlink information to a terminal over a first beam of a single-frequency network cell group, where the single-frequency network cell group includes at least two cells, the at least two cells include a first cell that supports transmission of at least two beams, and the first beam is one of the beams supported by the first cell.

According to a fourth aspect, an embodiment of the present disclosure provides a network device, the network device including a processor, a memory, and a program stored in the memory and capable of running on the processor, where when the processor executes the program, the steps of the foregoing information transmission method are implemented.

According to a fifth aspect, an embodiment of the present disclosure provides a terminal, including:

a first receiving module, configured to receive downlink information over a first beam of a single-frequency network cell group, where the single-frequency network cell group includes at least two cells, the at least two cells include a first cell that supports transmission of at least two beams, and the first beam is one of the beams supported by the first cell.

According to a sixth aspect, an embodiment of the present disclosure further provides a terminal, the terminal including a processor, a memory, and a program stored in the memory and running on the processor, where when the program is executed by the processor, the steps of the foregoing information transmission method are implemented.

According to a seventh aspect, an embodiment of the present disclosure provides a computer-readable storage medium, with a program stored thereon, where when the program is executed by a processor, the steps of the foregoing information transmission method are implemented.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and those of ordinary skill in the art can still derive other drawings from these accompanying drawings.

DETAILED DESCRIPTION OF EMBODIMENTS

Figures 1, 2:
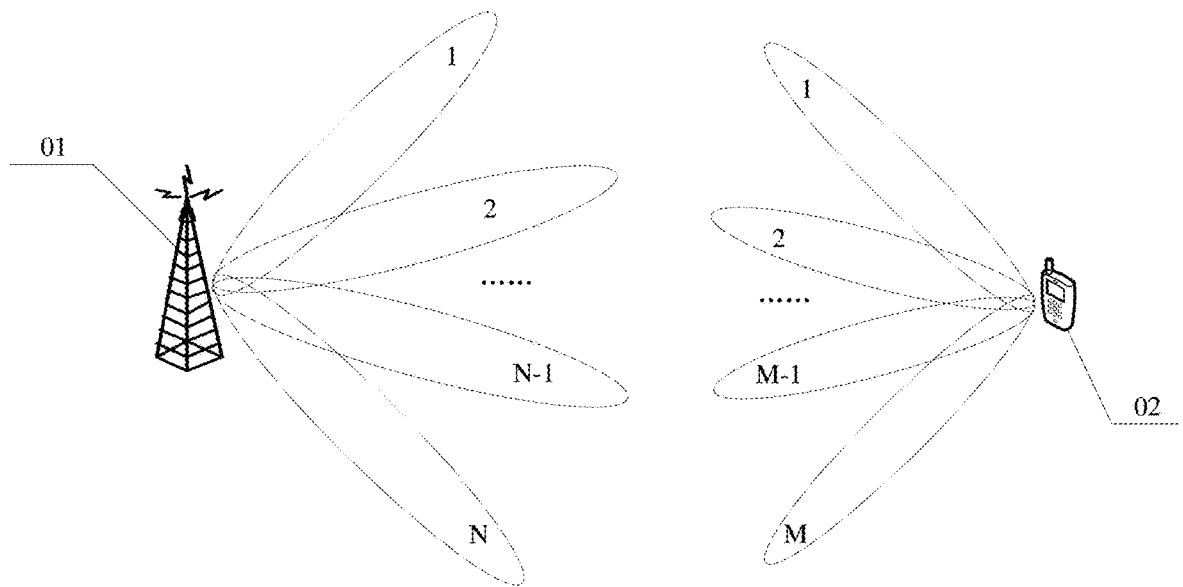
FIG. 1 represents a block diagram of a mobile communications system to which an embodiment of the present disclosure can be applied.
FIG. 2 represents a schematic flowchart of an information transmission method by a network device according to an embodiment of the present disclosure.

Exemplary embodiments of the present disclosure will be described below in further detail with reference to the accompanying drawings. Although the accompanying drawings show exemplary embodiments of the present disclosure, it should be understood that the present disclosure can be implemented in various forms and shall not be limited by embodiments described herein. On the contrary, these embodiments are provided to help more clearly understand the present disclosure and entirely convey the scope of the present disclosure to those skilled in the art.

The terms "first", "second", and the like in this specification and claims of the present disclosure are used to distinguish between similar objects instead of describing a specific sequence or order. It should be understood that such used data is exchangeable in a proper case, so that the embodiments of the present disclosure described herein, for example, can be implemented in sequences other than those shown in the figures or described herein. In addition, the terms "include", "have", and any other variants thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, product, or device. "And/or" used in this specification and claims means at least one of the associated objects.

The technology described herein is not limited to a long term evolution (LTE)/LTE-Advanced (LTE-A) system, and can also be used in various wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" are often used interchangeably. The technology described herein can be used in the above-mentioned systems and radio technologies as well as other systems and radio technologies. However, a new radio (NR) system is described in the following description for illustrative purposes, and the NR terminology is used in most of the following description, although these technologies can also be applied to applications other than the NR system application.

The following description provides examples and does not limit the scope, applicability, or configuration set forth in the claims. Alterations may be made to functions and arrangements of the discussed elements without departing from the spirit and scope of the present disclosure. In various examples, various procedures or components may be omitted, replaced, or added appropriately. For example, the described methods can be performed in a different order than that described, and various steps can be added, omitted, or combined. In addition, features described with reference to some examples may be combined in other examples.

Referring to FIG. 1, FIG. 1 shows a block diagram of a wireless communications system to which an embodiment of the present disclosure can be applied. The wireless communications system includes a network device 01 and a terminal 02. The network device 01 may be a base station or a core network. The base station may be a base station of 5G and later releases (for example, a gNB and a 5G NR NB), or a base station in other communications systems (for example, an eNB, a WLAN access point, or other access points). The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a WiFi node, or another appropriate term in the art. Provided that the same technical effects are achieved, the base station is not limited to specific technical vocabulary. It should be noted that in the embodiments of the present disclosure, the base station in the NR system is merely used as an example, but does not limit a specific type of the base station. The terminal 02 may be also referred to as a terminal device or a user terminal (UE). The terminal 02 may be a terminal-side device such as a mobile phone, a tablet computer, a laptop computer, a personal digital assistant (PDA), a mobile Internet device (MID), a wearable device, or a vehicle-mounted device. It should be noted that a specific type of the terminal 02 is not limited in the embodiments of the present disclosure.

The base station can communicate with the terminal 02 under the control of a base station controller. In various examples, the base station controller may be a part of the core network or some base stations. Some base stations can exchange control information or user data with the core network through backhaul. In some examples, some of these base stations can directly or indirectly communicate with each other over a backhaul link, which may be a wired or wireless communication link. The wireless communications system can support operations on a plurality of carriers (waveform signals of different frequencies). A multi-carrier transmitter can simultaneously transmit modulated signals on the plurality of carriers. For example, each communication link may be a multi-carrier signal modulated based on various radio technologies. Each modulated signal can be sent over different carriers and can carry control information (for example, a reference signal or a control channel), overhead information, data, and the like.

The base station can wirelessly communicate with the terminal 02 via one or more access point antennas. Each base station can provide communication coverage for its corresponding coverage area. A coverage area of an access point may be divided into sectors that form merely a part of the coverage area. The wireless communications system may include different types of base stations (for example, a macro base station, a micro base station, or a pico base station). The base station can also use different radio technologies, such as cellular or WLAN radio access technologies. The base station can be associated with the same or different access networks or operator deployment. Coverage areas of different base stations (including coverage areas of base stations of the same or different types, coverage areas using the same or different radio technologies, or coverage areas belonging to the same or different access networks) may overlap.

The communication link in the wireless communications system may include an uplink for carrying uplink (UL) transmission (for example, from the terminal 02 to the network device 01), or a downlink for carrying downlink (DL) transmission (for example, from the network device 01 to the terminal 02). The UL transmission may also be referred to as reverse link transmission, and the DL transmission may also be referred to as forward link transmission.

In the scenario shown in FIG. 1, the network device 01 and the terminal 02 implement signal transmission over an antenna beam, where the antenna beam is formed by a spatial transmission filter. The network device 01 and the terminal 02 each can contain a plurality of beams. For example, in FIG. 1, it is assumed that the network device 01 includes N transmission and reception points (TRP), and the TRPs each include a spatial transmission filter to form N beams; and the terminal 02 includes M spatial transmission filters to form M beams, where N and M are both integers greater than 1. N and M may be the same or different, which is not limited in the present disclosure.

An embodiment of the present disclosure provides an information transmission method, which is applied to a network device. As shown in FIG. 2, the method includes:

Step 21: Send downlink information to a terminal over a first beam of a single-frequency network cell group, where the single-frequency network cell group includes at least two cells, the at least two cells include a first cell that supports transmission of at least two beams, and the first beam is one of the beams supported by the first cell.

In this embodiment of the present disclosure, the single-frequency network cell group (SFN cell group) includes a plurality of cells, and the cells included in the SFN cell group may be configured by the network device. For example, the network device may configure a quantity and cell identifiers of cells in the SFN cell group. These cells include the first cell that supports a plurality of beams. All the cells in the single-frequency network cell group that support multi-beam transmission are referred to as the first cell, and there may be one first cell or a plurality of first cells. The first beam may be one of the beams supported by the cells in the single-frequency network cell group. It should be noted that the cells included in the single-frequency network cell group may be cells that support the same number of beams. If all the cells in the single-frequency network cell group support two beams, all the cells in the single-frequency network cell group are the first cell, and the first beam is one of the beams supported by the first cell. The cells included in the single-frequency network cell group may alternatively be cells that support different numbers of beams. If some of the cells in the single-frequency network cell group support two beams, the first beam is one of the two beams supported by the first cell. The remaining cells support one beam, and the first beam may also be the beam supported by the remaining cells.

The beams of the cells in the single-frequency network cell group are transmitted in a time-division manner. For example, the single-frequency network cell group includes a cell 1 and a cell 2, and both the cell 1 and the cell 2 support a beam 1 and a beam 2. Then, at moment T1, both the cell 1 and the cell 2 perform transmission over the beam 1; and at moment T2, both the cell 1 and the cell 2 perform transmission over the beam 2. In other words, at moment T1, all the cells in the single-frequency network cell group perform transmission over the beam 1; and at moment T2, all the cells in the single-frequency network cell group perform transmission over the beam 2. If each cell supports more beams, the case is similar. For example, if four beams are supported, at moment T1, all the cells in the single-frequency network cell group perform transmission over a beam 1; at moment T2, all the cells in the single-frequency network cell group perform transmission over a beam 2; at moment T3, all the cells in the single-frequency network cell group perform transmission over a beam 3; and at moment T4, all the cells in the single-frequency network cell group perform transmission over a beam 4. Alternatively, the single-frequency network cell group includes a cell 1 and a cell 2, the cell 1 supports one beam (beam 1), and the cell 2 supports the beam 1 and a beam 2. Then, at moment T1, both the cell 1 and the cell 2 perform transmission over their respective beams 1; and at moment T2, the cell 1 still performs transmission over its corresponding beam 1, and the cell 2 performs transmission over its corresponding beam 2. Still alternatively, the single-frequency network cell group includes a cell 1 and a cell 2, the cell 1 supports a beam 1 and a beam 2, and the cell 2 supports the beam 1, the beam 2, a beam 3, and a beam 4. Then, at moment T1, both the cell 1 and the cell 2 perform transmission over their respective beams 1; at moment T2, the cell 1 still performs transmission over its corresponding beam 1, and the cell 2 performs transmission over its corresponding beam 2; at moment T3, the cell 1 performs transmission over its corresponding beam 2, and the cell 2 performs transmission over its corresponding beam 3; and at moment T4, the cell 1 performs transmission over its corresponding beam 2, and the cell 2 performs transmission over its corresponding beam 4. The beam 1, beam 2, beam 3, and beam 4 mentioned in this embodiment are merely beam numbers, and beams with the same number that correspond to different cells may have different beam directions. For example, when the cell 1 supports only the beam 1, the beam 1 is an omnidirectional beam; and when cell 1 supports the beam 1 and the beam 2, both the beam 1 and the beam 2 are narrowband beams.

In this embodiment of the present disclosure, step 21 includes: sending the downlink information to the terminal over the first beam of the single-frequency network cell group in different transmission time periods. The different transmission time periods mentioned herein are different transmission time periods corresponding to the first beam. For example, if the beam 1 is transmitted at moment T1, the beam 2 is transmitted at moment T2, the beam 1 is transmitted at moment T3, and the beam 2 is transmitted at moment T4, different transmission time periods corresponding to the beam 1 refer to T1 and T3, and different transmission time periods corresponding to the beam 2 refer to T2 and T4.

Further, the downlink information is repeatedly sent in the transmission time periods, that is, the network device can support repeated transmission of signals in terms of time. For example, each piece of downlink information is repeatedly sent at a plurality of moments over the same beam, and a corresponding terminal may perform combined reception of the beam signal at the plurality of moments. For example, the downlink information is repeatedly sent at moment T1 and moment T3 over the beam 1. Alternatively, the downlink information is sent jointly over first beams in the different transmission time periods. For example, channel coding and rate matching are performed on the downlink information to obtain a bit sequence to be sent, and the bit sequence is divided into a plurality of bit subsequences, which are sent over the first beams in the different transmission time periods. For example, a bit sequence of the downlink information is divided into two bit subsequences, and the two bit subsequences are sent jointly over the beam 1 at moment T1 and moment T3.

In this embodiment of the present disclosure, the downlink information is sent in an orthogonal frequency division multiplexing (OFDM) mode, and the OFDM mode uses an extended cyclic prefix (CP) or a normal CP. The downlink information is sent in an OFDM mode with an extended CP, to combat a larger multipath delay spread.

The downlink information in this embodiment of the present disclosure is sent over a dedicated bandwidth part (BWP), such as a downlink initial BWP (Down Initial BWP), that corresponds to the single-frequency network cell group. Further, the network device may configure the terminal on a dedicated BWP corresponding to the single-frequency network cell group, or configure the terminal on a BWP corresponding to a cell. The two BWPs can be switched to each other. For example, the network device may hand over the terminal from the dedicated BWP of the single-frequency network cell group to the BWP of the cell, and vice versa. Therefore, details are not described herein.

The downlink information in this embodiment of the present disclosure includes: at least one piece of information carried by a synchronization signal block (SSB), a paging signal, a wake-up signal (WUS), a go-to-sleep signal (GTS signal), a physical broadcast channel (PBCH), a dedicated demodulation reference signal (DMRS), a channel state information reference signal (CSI-RS), and a system information block (SIB). The pieces of downlink information may be sent repeatedly or jointly in the different transmission time periods corresponding to the first beams of the single-frequency network cell group in an OFDM mode with the extended CP or the normal CP.

Transmission format related information of the downlink information is configured by using cell-specific (cell specific) information, for example, by using a cell-specific PBCH, SIB 1, or radio resource control (RRC) signaling. Alternatively, the transmission format related information is configured by using information specific to the single-frequency network cell group, for example, by using an SFN-based PBCH, SIB 1, or RRC signaling. Alternatively, the transmission format related information is predefined, for example, through a protocol agreement. The transmission format related information described herein includes at least one of a transmission period, a numerology, the number of beams, and time-frequency domain resources. The numerology includes at least one of a subcarrier spacing, an OFDM symbol length, a CP length, and the like.

The network device may also configure the terminal to perform radio resource management (RRM) measurement and/or radio link monitoring (RLM) measurement by using at least one of an SSB, a CSI-RS, and a DMRS that are specific to the SFN cell group.

Figure 3:
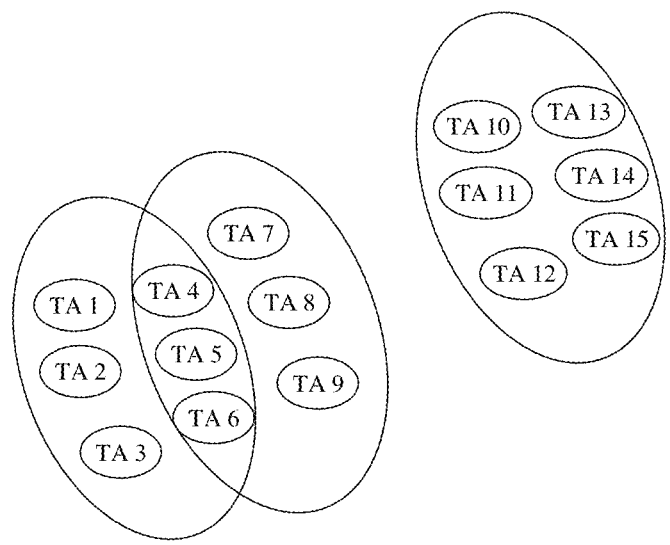
FIG. 3 represents a schematic diagram of cell coverage in a TA list according to an embodiment of the present disclosure.

Further, the cells in the single-frequency network cell group include: cells in a tracking area (TA), cells in a TA list, or cells in a radio access network based notification area (RNA). The tracking area is a concept established by the system for location management of the terminal. When the terminal is in an idle state, the network device can know a tracking area in which the terminal is located. In addition, when the terminal in the idle state needs to be paged, the network device needs to perform paging in all cells in a registered tracking area of the terminal. The TA is a cell-level configuration, a same TA may be configured for a plurality of cells, and one cell can only belong to one TA. A tracking area identity (TAI) includes a public land mobile network (PLMN) and a tracking area code (TAC), that is, TAI=PLMN+TAC. As shown in FIG. 3, a plurality of TAs form a TA list and are assigned to a terminal at the same time. When the terminal moves within the TA list, a TA update does not need to be performed, to reduce frequent interaction with a network. When the terminal enters a new TA area that is not in the registered TA list of the terminal, a TA update needs to be performed, and the network device reassigns a group of TAs to the terminal, where the newly assigned TAs may also include some TAs in the original TA list. If the terminal moves across the TAs in the TA list, a TA update is not performed. A set of cells covered by the RNA may be a subset of the set of cells that form a TA or a TA list.

Before step 21, the method further includes: configuring group related information of the single-frequency network cell group for the terminal, where the group related information includes at least one of a single-frequency network cell group identifier, a single-frequency network cell group frequency, and a synchronization signal block pattern (pattern).

When the terminal accesses an SFN cell group, an RRM measurement period may be relaxed. In other words, a radio resource management RRM measurement period of the single-frequency network cell group is greater than or equal to an RRM measurement period of a cell, where the cell is a cell included in the single-frequency network cell group.

The single-frequency network cell group supports dedicated beam management and/or dedicated beam failure recovery (BFR). In other words, the system supports beam management and/or beam failure recovery specific to an SFN cell group.

A synchronization raster (sync raster) of an SSB corresponding to the single-frequency network cell group is different from a synchronization raster of an SSB corresponding to a cell. In other words, a location of an SFN SSB may be different from a sync raster of a cell SSB. It should be noted that the terminal does not search for the SFN SSB during initial access.

At least one of an SSB, a CSI-RS, and a DMRS of the single-frequency network cell group corresponds to a generation sequence and/or scrambling sequence specific to the single-frequency network cell group. For example, a DMRS of the single-frequency network cell group (SFN based DMRS) for demodulating a PBCH corresponds to a dedicated scrambling phase and generation sequence.

Signal quality of the single-frequency network cell group is determined by the terminal based on beam detection of the single-frequency network cell group. For example, the signal quality of the SFN cell group may be evaluated through joint detection on a plurality of beams in the single-frequency network cell group.

In addition, the network device may further configure enabling and disabling of an SFN cell group specific BWP. Enabling and disabling of at least one of an SSB, a PBCH, a SIB, paging, a WUS, and a GTS on the SFN cell group specific BWP is configured. The terminal may be further configured to camp on an SSB of the SFN or camp on an SSB of a cell, and the SSBs support handover between each other.

In this embodiment of the present disclosure, a single-frequency network gain can be obtained, network coverage can be improved, and times of cell reselections can also be reduced; in addition, a narrow beam gain can be obtained, and network coverage can further be improved.

The information transmission methods in different scenarios are separately described in detail in the foregoing embodiment. A network device corresponding to the method is further described in the following embodiment with reference to the accompanying drawings.

Figure 4:
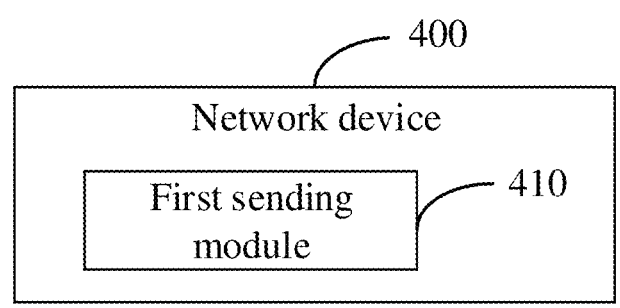
FIG. 4 represents a schematic diagram of a modular structure of a network device according to an embodiment of the present disclosure.

As shown in FIG. 4, a network device 400 in this embodiment of the present disclosure can implement details of the following method, with the same technical effect achieved, the method including: sending downlink information to a terminal over a first beam of a single-frequency network cell group, where the single-frequency network cell group includes at least two cells, the at least two cells include a first cell that supports transmission of at least two beams, and the first beam is one of the beams supported by the first cell. The network device 400 may include the following functional module:

a first sending module 410, configured to send downlink information to a terminal over a first beam of a single-frequency network cell group, where the single-frequency network cell group includes at least two cells, the at least two cells include a first cell that supports transmission of at least two beams, and the first beam is one of the beams supported by the first cell.

The first sending module 410 includes:

a first sending submodule, configured to send the downlink information to the terminal over the first beam of the single-frequency network cell group in different transmission time periods.

The downlink information is repeatedly sent in the transmission time periods, or the downlink information is sent jointly over first beams in the different transmission time periods.

The downlink information is sent in an orthogonal frequency division multiplexing OFDM mode, and the OFDM mode uses an extended cyclic prefix CP or a normal CP.

The downlink information is sent over a dedicated bandwidth part BWP corresponding to the single-frequency network cell group.

The network device 400 further includes:

a first configuration module, configured to configure the terminal on the dedicated BWP corresponding to the single-frequency network cell group, or a second configuration module, configured to configure the terminal on a BWP corresponding to a cell.

The downlink information includes: at least one piece of information carried by a synchronization signal block, a paging signal, a wake-up signal, a go-to-sleep signal, a physical broadcast channel, a dedicated demodulation reference signal, a channel state information reference signal, and a system information block.

Transmission format related information of the downlink information is configured by using cell-specific information, or the transmission format related information is configured by using information specific to the single-frequency network cell group, or the transmission format related information is predefined.

The transmission format related information includes at least one of a transmission period, a numerology, the number of beams, and time-frequency domain resources.

The network device 400 further includes:

a third configuration module, configured to configure the terminal to perform radio resource management RRM measurement and/or radio link monitoring RLM measurement by using at least one of the SSB, the CSI-RS, and the DMRS.

The cells in the single-frequency network cell group include: cells in a tracking area TA, cells in a TA list, or cells in a radio access network based notification area.

The network device 400 further includes:

a fourth configuration module, configured to configure group related information of the single-frequency network cell group for the terminal, where the group related information includes at least one of a single-frequency network cell group identifier, a single-frequency network cell group frequency, and a synchronization signal block pattern.

A radio resource management RRM measurement period of the single-frequency network cell group is greater than or equal to an RRM measurement period of a cell, where the cell is a cell included in the single-frequency network cell group.

The single-frequency network cell group supports dedicated beam management and/or dedicated beam failure recovery.

A synchronization raster of an SSB corresponding to the single-frequency network cell group is different from a synchronization raster of an SSB corresponding to a cell.

At least one of an SSB, a CSI-RS, and a DMRS of the single-frequency network cell group corresponds to a generation sequence and/or scrambling sequence specific to the single-frequency network cell group.

Signal quality of the single-frequency network cell group is determined based on beam detection of the single-frequency network cell group.

It should be noted that, in this embodiment of the present disclosure, a single-frequency network gain can be obtained, network coverage can be improved, and times of cell reselections can also be reduced; in addition, a narrow beam gain can be obtained, and network coverage can further be improved.

To better achieve the foregoing objective, an embodiment of the present disclosure further provides a network device, including a processor, a memory, and a computer program stored in the memory and capable of running on the processor, where when the processor executes the computer program, the steps of the foregoing information transmission method are implemented. An embodiment of the present disclosure further provides a computer-readable storage medium, where the computer-readable storage medium stores a computer program, and when the computer program is executed by a processor, the steps of the foregoing information transmission method are implemented.

Figures 5, 6:
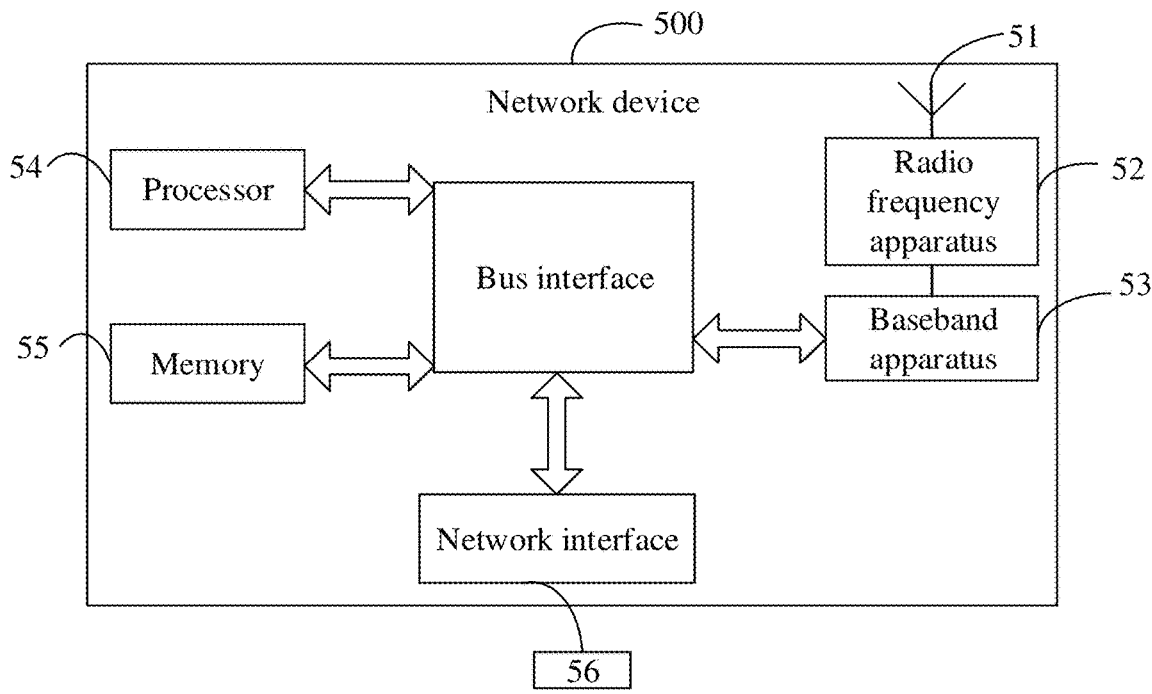
FIG. 5 represents a block diagram of a network device according to an embodiment of the present disclosure.
FIG. 6 represents a schematic flowchart of an information transmission method by a terminal according to an embodiment of the present disclosure.

In an example, an embodiment of the present disclosure further provides a network device. As shown in FIG. 5, the network device 500 includes: an antenna 51, a radio frequency apparatus 52, and a baseband apparatus 53. The antenna 51 is connected to the radio frequency apparatus 52. In the uplink direction, the radio frequency apparatus 52 receives information through the antenna 51, and sends the received information to the baseband apparatus 53 for processing. In the downlink direction, the baseband apparatus 53 processes information to be sent and sends the information to the radio frequency apparatus 52, and the radio frequency apparatus 52 processes the received information and then sends the information through the antenna 51.

The foregoing band processing apparatus may be located in the baseband apparatus 53, and the method performed by the network device in the foregoing embodiment may be implemented in the baseband apparatus 53. The baseband apparatus 53 includes a processor 54 and a memory 55.

The baseband apparatus 53 may include, for example, at least one baseband board, and a plurality of chips are arranged on the baseband board. As shown in FIG. 5, one of the chips is, for example, the processor 54, which is connected to the memory 55, to invoke a program in the memory 55, so as to perform the operations of the network device shown in the foregoing method embodiment.

The baseband apparatus 53 may further include a network interface 56, configured to exchange information with the radio frequency apparatus 52, where the interface is, for example, a common public radio interface (CPRI).

The processor herein may be a single processor, or may be a collective term for a plurality of processing elements. For example, the processor may be a CPU or an ASIC, or may be one or more integrated circuits that are configured to implement the foregoing method performed by the network device, for example, may be one or more microprocessors DSPs, or one or more field programmable gate arrays FPGAs. The storage element may be one memory or a collective term for a plurality of storage elements.

The memory 55 may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. By way of example but not restrictive description, many forms of RAM may be used, for example, a static random access memory (SRAM), a dynamic random access memory (DRAM), a synchronous dynamic random access memory (SDRAM), a double data rate synchronous dynamic random access memory (DDRS-DRAM), an enhanced synchronous dynamic random access memory (ESDRAM), a synchronous link dynamic random access memory (SLDRAM), and a direct rambus random access memory (DRRAM). The memory 55 described in the present disclosure is intended to include but is not limited to these and any other suitable types of memories.

In an example, the network device in this embodiment of the present disclosure further includes a computer program stored in the memory 55 and capable of running on the processor 54, and the processor 54 invokes the computer program in the memory 55 to perform the method performed by the modules shown in FIG. 4.

In an example, when being invoked by the processor 54, the computer program may be configured to: send downlink information to a terminal over a first beam of a single-frequency network cell group, where the single-frequency network cell group includes at least two cells, the at least two cells include a first cell that supports transmission of at least two beams, and the first beam is one of the beams supported by the first cell.

According to the network device in this embodiment of the present disclosure, an SFN gain can be obtained, network coverage can be improved, and times of cell reselections can also be reduced; in addition, a narrow beam gain can be obtained, and network coverage can further be improved.

The foregoing embodiment describes the information transmission method of the present disclosure on the network device side. The following embodiment further describes an information transmission method on a terminal side with reference to the accompanying drawings.

As shown in FIG. 6, the information transmission method, which is applied to a terminal side, in this embodiment of the present disclosure may include the following step:

Step 61: Receive downlink information over a first beam of a single-frequency network cell group, where the single-frequency network cell group includes at least two cells, the at least two cells include a first cell that supports transmission of at least two beams, and the first beam is one of the beams supported by the first cell.

The single-frequency network cell group includes a plurality of cells, and these cells include the first cell that supports a plurality of beams. All the cells in the single-frequency network cell group that support multi-beam transmission are referred to as the first cell, and there may be one first cell or a plurality of first cells. The first beam is one of the beams supported by the cells in the single-frequency network cell group. It should be noted that the cells included in the single-frequency network cell group may be cells that support the same number of beams. The cells included in the single-frequency network cell group may alternatively be cells that support different numbers of beams. The beams of the cells in the single-frequency network cell group are transmitted in a time-division manner. Beams with the same number that correspond to different cells may have different beam directions.

Step 61 includes: receiving the downlink information over the first beam of the single-frequency network cell group in different transmission time periods. The different transmission time periods mentioned herein are different transmission time periods corresponding to the first beam.

Further, after the step of receiving the downlink information over the first beam of the single-frequency network cell group in different transmission time periods, the method further includes:

combining downlink information received in the different transmission time periods, to obtain the downlink information, where this manner corresponds to a scenario in which the downlink information is repeatedly sent in at least two transmission time periods corresponding to the first beam, and the terminal combines information received in each transmission time period, to obtain the downlink information; or performing concatenation and channel decoding on downlink information received in a synchronous transmission time period, to obtain the downlink information, where this manner corresponds to a scenario in which the downlink information is jointly sent in at least two transmission time periods corresponding to the first beam, and the terminal concatenates, for channel decoding, information received in each transmission time period, to obtain the downlink information.

The downlink information is sent in an orthogonal frequency division multiplexing OFDM mode, and the OFDM mode uses an extended cyclic prefix CP or a normal CP. The downlink information is sent in an OFDM mode with an extended CP, to combat a larger multipath delay spread.

The downlink information is received over a dedicated bandwidth part BWP, such as a downlink initial BWP, corresponding to the single-frequency network cell group. Correspondingly, before step 61, the method further includes: activating or deactivating the dedicated bandwidth part BWP based on a configuration of the network device. Further, the network device may configure the terminal on a dedicated BWP corresponding to the single-frequency network cell group, and the terminal activates the dedicated BWP. Alternatively, the network device may configure the terminal on a BWP corresponding to a cell, and the terminal deactivates the dedicated BWP corresponding to the single-frequency network cell group.

The downlink information includes: at least one piece of information carried by a synchronization signal block, a paging signal, a wake-up signal, a go-to-sleep signal, a physical broadcast channel, a dedicated demodulation reference signal, a channel state information reference signal, and a system information block. The pieces of downlink information may be transmitted repeatedly or jointly in the different transmission time periods corresponding to the first beams of the single-frequency network cell group in an OFDM mode with the extended CP or the normal CP.

Transmission format related information of the downlink information includes at least one of a transmission period, a numerology, the number of beams, and time-frequency domain resources. The numerology includes at least one of a subcarrier spacing, an OFDM symbol length, a CP length, and the like.

The terminal may further perform radio resource management RRM measurement and/or radio link monitoring RLM measurement by using at least one of the SSB, the CSI-RS, and the DMRS.

The terminal does not perform cell reselection or cell handover when moving within one single-frequency network cell group. In other words, when the terminal moves within the coverage of an SFN cell group, SFN cell group/cell reselection or handover does not need to be performed.

The terminal performs reselection of a single-frequency network cell group or handover of a single-frequency network cell group when moving across different single-frequency network cell groups. In other words, when the terminal moves across different SFN cell groups, SFN cell group reselection or handover needs to be performed.

Before step 61, the method further includes: performing the following steps to access a cell: searching for an SSB corresponding to the cell for synchronization, reading broadcast information by using a PBCH corresponding to the cell, and reading system information by using a SIB corresponding to the cell, where the cell is a cell included in the single-frequency network cell group. There is no strict requirement for a timing sequence between these steps. Synchronization may be performed first, and then the broadcast information is read, or vice versa. That is, the terminal performs synchronization through the SSB of the cell during initial access, and reads the broadcast information and system information through the PBCH and SIB of the cell, respectively.

The information transmission method in this embodiment of the present disclosure further includes the following step: accessing the single-frequency network cell group when the terminal is in an idle state or an inactive state, that is, when in the Idle/inactive state, the terminal accesses the SSB of the SFN, and the terminal may perform RRM measurement, synchronization, and system information acquisition through the SSB of the SFN; or accessing the single-frequency network cell group when an amount of data to be transmitted is lower than a threshold, for example, data is received or uploaded for a small amount of data or infrequent data packets (such as heartbeat packets) or the like through an SFN cell group specific BWP.

The information transmission method in this embodiment of the present disclosure further includes the following step: accessing a cell when the terminal is in a connected state, that is, when entering the connected state, the terminal performs RRM measurement, synchronization, and system information acquisition through a cell specific SSB; or accessing a cell when the amount of data to be transmitted is higher than the threshold, for example, when the amount of data to be transmitted is large, data is received or uploaded for the large amount of data through a cell specific BWP. The cell herein is a cell included in the single-frequency network cell group.

When the terminal accesses an SFN cell group, an RRM measurement period may be relaxed. In other words, a radio resource management RRM measurement period of the single-frequency network cell group is greater than or equal to an RRM measurement period of a cell, where the cell is a cell included in the single-frequency network cell group.

The single-frequency network cell group supports dedicated beam management and/or dedicated beam failure recovery. In other words, the system supports beam management and/or beam failure recovery specific to an SFN cell group.

A synchronization raster of an SSB corresponding to the single-frequency network cell group is different from a synchronization raster of an SSB corresponding to a cell. In other words, a location of an SFN SSB may be different from a synchronization raster of a cell SSB. It should be noted that the terminal does not search for the SFN SSB during initial access.

At least one of an SSB, a CSI-RS, and a DMRS of the single-frequency network cell group corresponds to a generation sequence and/or scrambling sequence specific to the single-frequency network cell group. For example, a DMRS of the single-frequency network cell group for demodulating a PBCH corresponds to a dedicated scrambling phase and generation sequence.

Signal quality of the single-frequency network cell group is determined based on beam detection of the single-frequency network cell group. For example, the signal quality of the SFN cell group may be evaluated through joint detection on a plurality of beams in the single-frequency network cell group.

In addition, the network device may further configure enabling and disabling of an SFN cell group specific BWP. Enabling and disabling of at least one of an SSB, a PBCH, a SIB, Paging, a WUS, and a GTS signal on the SFN cell group specific BWP is configured. The terminal may be further configured to camp on an SSB of the SFN or camp on an SSB of a cell, and the SSBs support handover between each other.

In this embodiment of the present disclosure, a single-frequency network gain can be obtained, network coverage can be improved, and times of cell reselections can also be reduced; in addition, a narrow beam gain can be obtained, and network coverage can further be improved.

The information transmission methods in different scenarios are described in detail in the foregoing embodiment. A terminal corresponding to the method is further described in the following embodiment with reference to the accompanying drawings.

Figure 7:
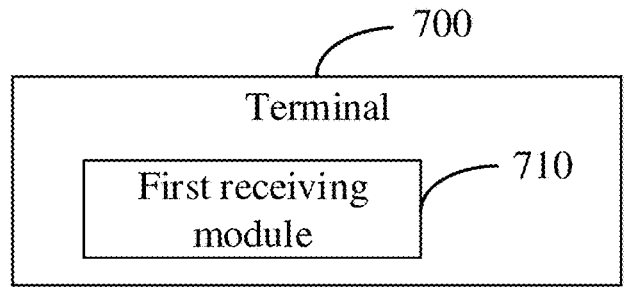
FIG. 7 represents a schematic diagram of a modular structure of a terminal according to an embodiment of the present disclosure.

As shown in FIG. 7, a terminal 700 in this embodiment of the present disclosure can implement details of the following method, with the same technical effect achieved, the method including: receiving downlink information over a first beam of a single-frequency network cell group, where the single-frequency network cell group includes at least two cells, the at least two cells include a first cell that supports transmission of at least two beams, and the first beam is one of the beams supported by the first cell. The terminal 700 may include the following functional module:

a first receiving module 710, configured to receive downlink information over a first beam of a single-frequency network cell group, where the single-frequency network cell group includes at least two cells, the at least two cells include a first cell that supports transmission of at least two beams, and the first beam is one of the beams supported by the first cell.

The first receiving module 710 includes:

a first receiving submodule, configured to receive the downlink information over the first beam of the single-frequency network cell group in different transmission time periods.

The terminal 700 further includes:

a first processing module, configured to combine downlink information received in the different transmission time periods, to obtain the downlink information;

or a second processing module, configured to perform concatenation and channel decoding on downlink information received in a synchronous transmission time period, to obtain the downlink information.

The downlink information is sent in an orthogonal frequency division multiplexing OFDM mode, and the OFDM mode uses an extended cyclic prefix CP or a normal CP.

The downlink information is received over a dedicated bandwidth part BWP corresponding to the single-frequency network cell group.

The terminal 700 further includes:

a third processing module, configured to activate or deactivate the dedicated bandwidth part BWP based on a configuration of the network device.

The downlink information includes: at least one piece of information carried by a synchronization signal block SSB, a paging signal, a wake-up signal WUS, a go-to-sleep signal GTS, a physical broadcast channel PBCH, a dedicated demodulation reference signal DMRS, a channel state information reference signal CSI-RS, and a system information block SIB.

Transmission format related information of the downlink information includes at least one of a transmission period, a numerology, the number of beams, and time-frequency domain resources.

The terminal 700 includes:

a measurement module, configured to perform radio resource management RRM measurement and/or radio link monitoring RLM measurement by using at least one of the SSB, the CSI-RS, and the DMRS.

The terminal does not perform cell reselection or cell handover when moving within one single-frequency network cell group.

The terminal performs reselection of a single-frequency network cell group or handover of a single-frequency network cell group when moving across different single-frequency network cell groups.

The terminal 700 further includes:

a first access module, configured to perform the following steps to access a cell:

searching for an SSB corresponding to the cell for synchronization, reading broadcast information by using a PBCH corresponding to the cell, and reading system information by using a SIB corresponding to the cell, where the cell is a cell included in the single-frequency network cell group.

The terminal 700 further includes:

a second access module, configured to access the single-frequency network cell group when the terminal is in an idle state or an inactive state; or a third access module, configured to access the single-frequency network cell group when an amount of data to be transmitted is lower than a threshold.

The terminal 700 further includes:

a fourth access module, configured to access a cell when the terminal is in a connected state; or a fifth access module, configured to access a cell when the amount of data to be transmitted is higher than the threshold.

The cell herein is a cell included in the single-frequency network cell group.

A radio resource management RRM measurement period of the single-frequency network cell group is greater than or equal to an RRM measurement period of a cell, where the cell is a cell included in the single-frequency network cell group.

The single-frequency network cell group supports dedicated beam management and/or dedicated beam failure recovery.

A synchronization raster of an SSB corresponding to the single-frequency network cell group is different from a synchronization raster of an SSB corresponding to a cell.

At least one of an SSB, a CSI-RS, and a DMRS of the single-frequency network cell group corresponds to a generation sequence and/or scrambling sequence specific to the single-frequency network cell group.

Signal quality of the single-frequency network cell group is determined based on beam detection of the single-frequency network cell group.

It should be noted that, in this embodiment of the present disclosure, a single-frequency network gain can be obtained, network coverage can be improved, and times of cell reselections can also be reduced; in addition, a narrow beam gain can be obtained, and network coverage can further be improved.

It should be noted that, it should be understood that the division of the various modules of the foregoing network device and terminal is merely logical function division, and during actual implementation, the various modules may be completely or partially integrated into one physical entity, or may be physically separated. In addition, these modules may all be implemented in the form of software being invoked by processing elements; or may all be implemented in the form of hardware; or some of the modules may be implemented in the form of software being invoked by processing elements, and some of the modules may be implemented in the form of hardware. For example, the determining module may be a separately disposed processing element, or may be integrated into a chip of the foregoing apparatus for implementation. In addition, the determining module may also be stored in the memory of the foregoing apparatus in the form of program code, and a processing element of the foregoing apparatus invokes the program code and performs the functions of the foregoing determining module. The implementations of other modules are similar thereto. In addition, all or some of these modules may be integrated together or implemented independently. The processing element herein may be an integrated circuit having a signal processing capability. During implementation, the steps of the foregoing method or the foregoing modules can be completed by hardware integrated logic circuits in the processor element or instructions in the form of software.

For example, the foregoing modules may be configured as one or more integrated circuits for implementing the foregoing method, for example, one or more application-specific integrated circuits (ASIC), or one or more microprocessors (DSP), or one or more field programmable gate arrays (FPGA). For another example, when one of the foregoing modules is implemented in the form of program code being scheduled by a processing element, the processing element may be a general-purpose processor, such as a central processing unit (CPU) or another processor that can invoke program code. For another example, the modules may be integrated and implemented in a form of a system-on-a-chip (SOC).

Figure 8:
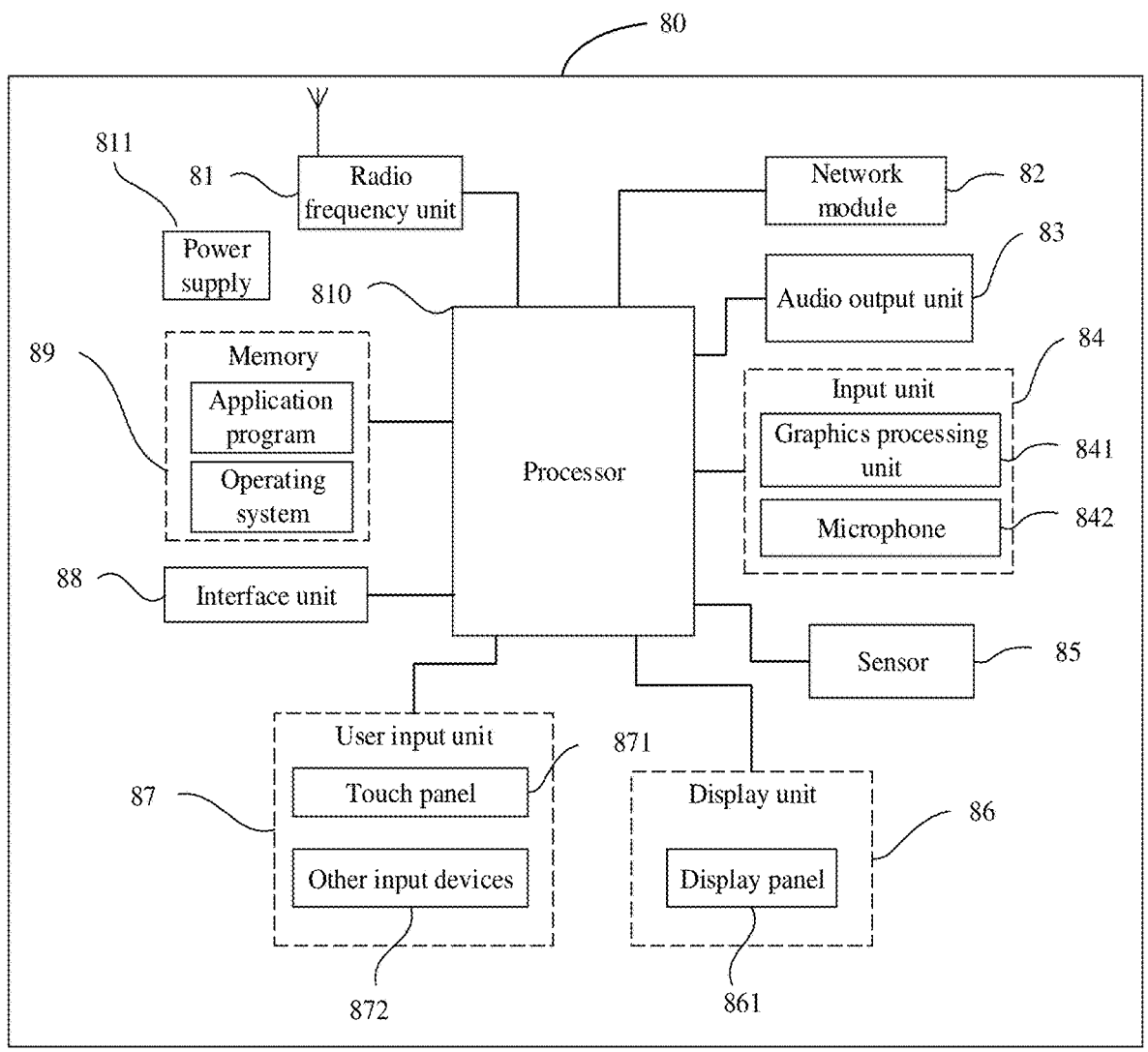
FIG. 8 represents a block diagram of a terminal according to an embodiment of the present disclosure.

To better achieve the foregoing objective, further, FIG. 8 is a schematic structural diagram of hardware of a terminal for implementing the various embodiments of the present disclosure. The terminal 80 includes, but is not limited to, components such as a radio frequency unit 81, a network module 82, an audio output unit 83, an input unit 84, a sensor 85, a display unit 86, a user input unit 87, an interface unit 88, a memory 89, a processor 810, and a power supply 811. Those skilled in the art may understand that the terminal structure shown in FIG. 8 does not constitute a limitation to the terminal. The terminal may include more or fewer components than those shown in the figure, or some components may be combined, or there may be a different component arrangement. In the embodiments of the present disclosure, the terminal includes, but is not limited to, a mobile phone, a tablet computer, a notebook computer, a palmtop computer, a vehicle-mounted terminal, a wearable device, a pedometer, or the like.

The radio frequency unit 81 is configured to receive and send data under the control of the processor 810, and is specifically configured to receive downlink information over a first beam of a single-frequency network cell group, where the single-frequency network cell group includes at least two cells, the at least two cells include a first cell that supports transmission of at least two beams, and the first beam is one of the beams supported by the first cell.

According to the terminal in this embodiment of the present disclosure, a single-frequency network gain can be obtained, network coverage can be improved, and times of cell reselections can also be reduced; in addition, a narrow beam gain can be obtained, and network coverage can further be improved.

It should be understood that in this embodiment of the present disclosure, the radio frequency unit 81 may be configured to receive and send signals in an information receiving and sending or call process. For example, after receiving downlink data from a base station, the radio frequency unit 81 sends the downlink data to the processor 810 for processing, and in addition, sends uplink data to the base station. Generally, the radio frequency unit 81 includes but is not limited to an antenna, at least one amplifier, a transceiver, a coupler, a low noise amplifier, a duplexer, and the like. In addition, the radio frequency unit 81 may further communicate with a network and other devices through a wireless communications system.

The terminal provides a user with wireless broadband Internet access through the network module 82, for example, helps the user send and receive emails, browse web pages, and access streaming media.

The audio output unit 83 may convert, into an audio signal, audio data received by the radio frequency unit 81 or the network module 82 or stored in the memory 89, and output the audio signal as sound. Moreover, the audio output unit 83 may further provide audio output (for example, call signal receiving sound and message receiving sound) related to a specific function performed by the terminal 80. The audio output unit 83 includes a speaker, a buzzer, a receiver, and the like.

The input unit 84 is configured to receive an audio signal or a video signal. The input unit 84 may include a graphics processing unit (GPU) 841 and a microphone 842, and the graphics processing unit 841 processes image data of a still picture or a video obtained by an image capture apparatus (for example, a camera) in an image capture mode or a video capture mode. A processed image frame may be displayed on the display unit 86. The image frames processed by the GPU 841 can be stored in the memory 89 (or another storage medium) or sent by the radio frequency unit 81 or the network module 82. The microphone 842 can receive sound and can process such sound into audio data. The processed audio data can be converted into a format output that can be sent to a mobile communications base station through the radio frequency unit 81 in a telephone call mode.

The terminal 80 further includes at least one sensor 85, for example, an optical sensor, a motion sensor, and other sensors. For example, the optical sensor includes an ambient light sensor and a proximity sensor, where the ambient light sensor can adjust brightness of the display panel 861 according to brightness of ambient light, and the proximity sensor can turn off the display panel 861 and/or backlight when the terminal 80 moves towards the ear. As a type of the motion sensor, an accelerometer sensor may detect an acceleration in each direction (generally, three axes), and detect a value and a direction of gravity when the accelerometer sensor is static, and may be used to recognize a terminal posture (such as screen switching between landscape and portrait modes, a related game, or magnetometer posture calibration), a function related to vibration recognition (such as a pedometer or a knock), and the like. The sensor 85 may further include a fingerprint sensor, a pressure sensor, an iris sensor, a molecule sensor, a gyroscope, a barometer, a hygrometer, a thermometer, and an infrared sensor. Details are not described herein.

The display unit 86 is configured to display information input by a user or information provided to a user. The display unit 86 may include a display panel 861, and the display panel 861 may be configured in a form of liquid crystal display (LCD), organic light-emitting diode (OLED), or the like.

The user input unit 87 may be configured to receive entered digit or character information and generate a key signal input related to user setting and function control of the terminal. For example, the user input unit 87 includes a touch panel 871 and other input devices 872. The touch panel 871, also called a touch screen, may collect a touch operation of the user on or near the touch panel 871 (for example, an operation performed by the user with any suitable object or accessory such as a finger or a stylus on or near the touch panel 871). The touch panel 871 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to a processor 810, and receives and executes a command sent by the processor 810. In addition, the touch panel 871 may be implemented by using a plurality of types such as a resistive type, a capacitive type, an infrared ray, and a surface acoustic wave. In addition to the touch panel 871, the user input unit 87 may also include other input devices 872. For example, the other input devices 872 may include, but are not limited to, a physical keyboard, functional keys (for example, a volume control key and a switch key), a trackball, a mouse, and a joystick. Details are not described herein again.

Further, the touch panel 871 may cover the display panel 861. When the touch panel 871 detects a touch operation on or near the touch panel 871, the touch operation is transmitted to the processor 810 to determine a type of a touch event, and then the processor 810 provides corresponding visual output on the display panel 861 according to the type of the touch event. In FIG. 8, the touch panel 871 and the display panel 861 are used as two independent components to implement input and output functions of the terminal. However, in some embodiments, the touch panel 871 and the display panel 861 may be integrated to implement the input and output functions of the terminal. This is not specifically limited herein.

The interface unit 88 is an interface connecting an external apparatus to the terminal 80. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 88 may be configured to receive an input (for example, data information and power) from an external apparatus and transmit the received input to one or more elements within the terminal 80, or may be configured to transmit data between the terminal 80 and the external apparatus.

The memory 89 may be configured to store software programs and various data. The memory 89 may mainly include a program storage area and a data storage area. The program storage area may store an operating system, an application program required by at least one function (such as a sound playback function and an image playback function), and the like. The data storage area may store data (such as audio data and a phone book) created based on use of the mobile phone, and the like. In addition, the memory 89 may include a high-speed random access memory, and may also include a non-volatile memory, such as at least one disk storage device, a flash memory device, or other volatile solid-state memory devices.

The processor 810 is a control center of the terminal. The processor 810 uses various interfaces and lines to connect the various parts of the entire terminal, and performs various functions of the terminal and processes data by running or executing software programs and/or modules stored in the memory 89 and invoking data stored in the memory 89, to monitor the terminal as a whole. The processor 810 may include one or more processing units. Optionally, the processor 810 may integrate an application processor and a modem processor. The application processor mainly deals with an operating system, a user interface, and an application program. The modem processor mainly deals with wireless communication. It can be understood that alternatively, the modem processor may not be integrated into the processor 810.

The terminal 80 may further include the power supply 811 (for example, a battery) configured to supply power to various components. Optionally, the power supply 811 may be logically connected to the processor 810 through a power management system, so as to implement functions such as managing charging, discharging, and power consumption through the power management system.

In addition, the terminal 80 includes some functional modules not shown. Details are not described herein again.

Optionally, an embodiment of the present disclosure further provides a terminal, including a processor 810, a memory 89, a computer program stored in the memory 89 and capable of running on the processor 810. When the computer program is executed by the processor 810, the processes of the information transmission method embodiment are implemented, with the same technical effect achieved. To avoid repetition, details are not described herein again. The terminal may be a wireless terminal or a wired terminal. The wireless terminal may be a device providing voice and/or other service data connectivity to a user, a handheld device with a wireless connection function, or another processing device connected to a wireless modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal is a device such as a personal communication service (PCS) telephone, a cordless telephone, a session initiation protocol (SIP) phone, a wireless local loop (WLL) station, or a personal digital assistant (PDA). The wireless terminal may also be referred to as a system, a subscriber unit, a subscriber station, a mobile station, a mobile, a remote station, a remote terminal, an access terminal, a user terminal, a user agent, or a user device (User Device or User Equipment). This is not limited herein.

An embodiment of the present disclosure further provides a computer-readable storage medium, where the computer-readable storage medium stores a computer program. When the computer program is executed by a processor, the processes of the embodiment of the foregoing information transmission method are implemented, with the same technical effects achieved. To avoid repetition, details are not described again herein. The computer readable storage medium may be a read-only memory (ROM), a random access memory (RAM), a magnetic disk, an optical disc, or the like.

Those of ordinary skill in the art can realize that the exemplary units and algorithm steps described with reference to the embodiments disclosed in this specification can be implemented by electronic hardware or a combination of computer software and electronic hardware. Whether these functions are implemented by hardware or software depends on specific applications and design constraints of the technical solutions. Those skilled in the art may use different methods to implement the described functions for each specific application, but such implementation should not be considered as beyond the scope of the present disclosure.

Those skilled in the art can clearly understand that to describe conveniently and concisely, for a specific working process of the system, apparatus, and unit described above, refer to the corresponding process in the foregoing method embodiments. Details are not described herein again.

In the embodiments provided in the present disclosure, it should be understood that the disclosed apparatuses and methods may be implemented in other ways. For example, the apparatus embodiments described above are only an example. For example, the division of the units is only logical function division. There may be other division manners in actual implementation, for example, multiple units or components may be combined or integrated into another system, or some features may be ignored or not implemented. In addition, the mutual coupling, direct coupling, or communication connection shown or discussed may be indirect coupling or communication connection through some interfaces, apparatuses, or units, and may be in electrical, mechanical, or other forms.

The units described as separate components may be or may not be physically separated, and the components displayed as units may be or may not be physical units, that is, may be located in one place or distributed on multiple network units. Some or all of the units may be selected according to actual needs to achieve the objective of the solutions of the embodiments.

In addition, functional units in each embodiment of the present disclosure may be integrated into one processing unit, or each unit may have separate physical existence, or two or more units may be integrated in one unit.

If the function is implemented in the form of software function units and sold or used as independent products, the function may be stored in a computer readable storage medium. Based on such an understanding, the technical solutions of the present disclosure essentially, or the part contributing to the prior art, or some of the technical solutions may be embodied in a form of a computer software product. The computer software product is stored in a storage medium, and includes several instructions for instructing a computer device (which may be a personal computer, a server, a network device, or the like) to perform all or some of the steps of the methods described in the embodiments of the present disclosure. The storage medium includes various mediums, such as a USB flash disk, a removable hard disk, a ROM, a RAM, a magnetic disk, or an optical disc, that can store program code.

In addition, it should be noted that in the apparatus and method of the present disclosure, apparently, the components or steps may be divided and/or recombined. These divisions and/or re-combinations should be considered as equivalent solutions of the present disclosure. Moreover, the steps for performing the foregoing series of processing may be performed naturally in chronological order according to a described sequence, but do not necessarily need to be performed in chronological order, and some steps may be performed in parallel or independently. Those of ordinary skill in the art can understand that all or any steps or components of the method and apparatus in the present disclosure may be implemented by hardware, firmware, software, or a combination thereof in any computing apparatus (including a processor, a storage medium, and the like) or a network of a computing apparatus. This can be implemented as long as those of ordinary skill in the art apply basic programming skill after reading the description of the present disclosure.

Therefore, the objective of the present disclosure may also be achieved by running a program or a set of programs on any computing apparatus. The computing apparatus may be a well-known general-purpose apparatus. Therefore, the objective of the present disclosure may also be achieved only by providing a program product including program code for implementing the method or the apparatus. In other words, such a program product also constitutes the present disclosure, and a storage medium storing such a program product also constitutes the present disclosure. Obviously, the storage medium may be any well-known storage medium or any storage medium to be developed in the future. It should also be noted that in the apparatus and method of the present disclosure, apparently, the components or steps may be divided and/or recombined. These divisions and/or re-combinations should be considered as equivalent solutions of the present disclosure. Moreover, the steps for performing the foregoing series of processing may be performed naturally in chronological order according to a described sequence, but do not necessarily need to be performed in chronological order, and some steps may be performed in parallel or independently.

The foregoing descriptions are merely the optional implementations of the present disclosure. It should be noted that those of ordinary skill in the art may further make several improvements and refinements without departing from the principles described in the present disclosure, and these improvements and refinements also fall within the protection scope of the present disclosure.

What is claimed is:

1. An information transmission method, comprising:
receiving, by a terminal, downlink information over a first beam of a single-frequency network cell group, wherein the single-frequency network cell group comprises at least two cells, the at least two cells comprise a first cell that supports transmission of at least two beams, and the first beam is one of the beams supported by the first cell; wherein
the downlink information is received over a dedicated bandwidth part (BWP) corresponding to the single-frequency network cell group; and
a BWP configured for the terminal is switchable between the dedicated BWP corresponding to the single-frequency network cell group and a BWP corresponding to a cell.

2. The information transmission method according to claim 1, wherein receiving, by the terminal, the downlink information over the first beam of the single-frequency network cell group comprises:
receiving, by the terminal, downlink information over the first beam of the single-frequency network cell group in different transmission time periods;
after receiving, by the terminal, the downlink information over the first beam of the single-frequency network cell group in different transmission time periods, the method further comprises:
combining, by the terminal, downlink information received in the different transmission time periods, to obtain the downlink information; or
performing, by the terminal, concatenation and channel decoding on downlink information received in a synchronous transmission time period, to obtain the downlink information.

3. The information transmission method according to claim 1, wherein the downlink information is sent in an orthogonal frequency division multiplexing (OFDM) mode, and the OFDM mode uses an extended cyclic prefix (CP).

4. The information transmission method according to claim 1, wherein the downlink information comprises: at least one piece of information carried by a synchronization signal block (SSB), a paging signal, a wake-up signal (WUS), a go-to-sleep (GTS) signal, a physical broadcast channel (PBCH), a dedicated demodulation reference signal (DMRS), a channel state information reference signal (CSI-RS), and a system information block (SIB).

5. The information transmission method according to claim 1, wherein transmission format related information of the downlink information comprises at least one of a transmission period, a numerology, the number of beams, and time-frequency domain resources.

6. The information transmission method according to claim 1, wherein the terminal does not perform cell reselection or cell handover when moving within one single-frequency network cell group; and/or
the terminal performs reselection of a single-frequency network cell group or handover of a single-frequency network cell group when moving across different single-frequency network cell groups.

7. The information transmission method according to claim 1, further comprising:
accessing, by the terminal, the single-frequency network cell group when the terminal is in an idle state or an inactive state; or
accessing, by the terminal, the single-frequency network cell group when an amount of data to be transmitted is lower than a threshold.

8. The information transmission method according to claim 1, wherein a radio resource management (RRM) measurement period of the single-frequency network cell group is greater than or equal to an RRM measurement period of a cell, wherein the cell is a cell comprised in the single-frequency network cell group.

9. The information transmission method according to claim 1, wherein the single-frequency network cell group supports dedicated beam management and/or dedicated beam failure recovery.

10. The information transmission method according to claim 1, wherein a synchronization raster of an SSB corresponding to the single-frequency network cell group is different from a synchronization raster of an SSB corresponding to a cell.

11. The information transmission method according to claim 1, wherein at least one of an SSB, a CSI-RS, and a DMRS of the single-frequency network cell group corresponds to a generation sequence and/or scrambling sequence specific to the single-frequency network cell group.

12. The information transmission method according to claim 1, wherein signal quality of the single-frequency network cell group is determined based on beam detection of the single-frequency network cell group.

13. The method according to claim 1, before the receiving, by the terminal, the downlink information over the first beam of the single-frequency network cell group, the method further comprising:
activating, by the terminal, the dedicated BWP corresponding to the single-frequency network cell group, in a case that a configuration of a network device indicates that the terminal is configured on the dedicated BWP corresponding to the single-frequency network cell group; or
deactivating, by the terminal, the dedicated BWP corresponding to the single-frequency network cell group, in a case that the configuration of the network device indicates that the terminal is configured on a BWP corresponding to a cell.

14. A network device, comprising: a processor, a memory, and a program stored in the memory and running on the processor, wherein the program, when executed by the processor, causes the network device to perform sending downlink information to a terminal over a first beam of a single-frequency network cell group; the single-frequency network cell group comprises at least two cells, the at least two cells comprise a first cell that supports transmission of at least two beams, and the first beam is one of the beams supported by the first cell; wherein
the downlink information is sent over a dedicated bandwidth part (BWP) corresponding to the single-frequency network cell group; and
the program, when executed by the processor, causes the network device to further perform:
configuring a BWP for the terminal to be switchable between the dedicated BWP corresponding to the single-frequency network cell group and a BWP corresponding to a cell.

15. The network device according to claim 14, wherein the program, when executed by the processor, causes the network device to perform:
sending downlink information to the terminal over the first beam of the single-frequency network cell group in different transmission time periods.

16. The network device according to claim 15, wherein the downlink information is repeatedly sent in the transmission time periods, or the downlink information is sent jointly over first beams in the different transmission time periods.

17. The network device according to claim 14, wherein the downlink information is sent in an orthogonal frequency division multiplexing (OFDM) mode, and the OFDM mode uses an extended cyclic prefix (CP) or a normal CP.

18. A terminal, comprising: a processor, a memory, and a program stored in the memory and running on the processor, wherein the program, when executed by the processor, causes the terminal to perform receiving downlink information over a first beam of a single-frequency network cell group; the single-frequency network cell group comprises at least two cells, the at least two cells comprise a first cell that supports transmission of at least two beams, and the first beam is one of the beams supported by the first cell; wherein
the downlink information is received over a dedicated bandwidth part (BWP) corresponding to the single-frequency network cell group; and
a BWP configured for the terminal is switchable between the dedicated BWP corresponding to the single-frequency network cell group and a BWP corresponding to a cell.

19. The terminal according to claim 18, wherein the program, when executed by the processor, causes the terminal to perform:
receiving downlink information over the first beam of the single-frequency network cell group in different transmission time periods.

20. The terminal according to claim 18, wherein the downlink information is sent in an orthogonal frequency division multiplexing (OFDM) mode, and the OFDM mode uses an extended cyclic prefix (CP).

* * * * *